United States Patent
Sanchez, II et al.

(10) Patent No.: US 6,356,957 B2
(45) Date of Patent: *Mar. 12, 2002

(54) METHOD FOR EMULATING NATIVE OBJECT ORIENTED FOUNDATION CLASSES ON A TARGET OBJECT ORIENTED PROGRAMMING SYSTEM USING A TEMPLATE LIBRARY

(75) Inventors: Humberto A. Sanchez, II; Lance D. Kind, both of Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 08/833,085

(22) Filed: Apr. 3, 1997

(51) Int. Cl.[7] .......................... G06F 15/163; G06F 9/46

(52) U.S. Cl. ...................................... 709/328; 709/316

(58) Field of Search ................................ 395/680–685, 395/702, 705; 709/100–105, 310–332

(56) References Cited

U.S. PATENT DOCUMENTS

| | | | |
|---|---|---|---|
| 5,327,559 A | | 7/1994 | Priven et al. ................ 395/700 |
| 5,329,619 A | * | 7/1994 | Page ........................... 395/200 |
| 5,386,564 A | | 1/1995 | Shearer et al. .............. 395/650 |
| 5,475,845 A | * | 12/1995 | Orton et al. ................. 395/680 |
| 5,542,078 A | | 7/1996 | Martel et al. ................ 395/600 |
| 5,579,521 A | * | 11/1996 | Shearer et al. .............. 709/310 |
| 5,583,983 A | * | 12/1996 | Schmitter .................... 395/705 |
| 5,732,270 A | * | 3/1998 | Foody et al. ................ 395/683 |
| 5,822,587 A | * | 10/1998 | McDonald et al. ......... 395/702 |

OTHER PUBLICATIONS

Doug Forguson, "Programming with the MFC document template architecture" C++ Report p. 36–41; 3/96.*
Frost et al; "Pragmatic object modeling; developing user interface objects", JOOP, p. 59–63, 9/96.*
Visual C++ 4 Unleashed, Chaps. 18 & 19, 1996.*
Ramin firoozye, "Examining the StarView application framework", Dro.Dobb's Journal, v18, n13, p78(6), Dec. 1993.*
"Microsoft foundation class library 4.0: C++ application framework for Microsoft Windows", MSDN, pp. 1–30; 9/95.*

(List continued on next page.)

Primary Examiner—Larry D. Donaghue (57) ABSTRACT

A system and method for porting a software application from a native object oriented programming system to a target object oriented programming system is presented. The native object oriented programming system includes an application framework layer built on a set of defined native foundation classes and an operating system layer running a native operating system. The target object oriented programming system also includes an application framework layer and an operating system layer. However, the application framework layer is built on a different set of foundation classes and the target operating system is different than the native operating system. A software application that has been implemented to interface with the native object oriented programming system via an application programming interface (API) built on the defined native foundation classes may be ported to run on the target operating system in a functionally equivalent manner as if running on the native object oriented programming system using the method of the invention. The method includes defining a set of target object oriented programming system data types in terms of the native object oriented programming system data types, and then emulating the defined native foundation classes by mapping the native API method invocations to template library calls.

8 Claims, 10 Drawing Sheets

OTHER PUBLICATIONS

Thomas Keffer, "Programming with the Standard Template Library", 1995.*

"HP announces Standard Template Library accepted by ANSO/ISO", C/C++ users Journal, v13,n4, p100 (1), Apr. 1995.*

Chuck Allison, "The standard C++ library", C/C++ user Journal v12, n12,p69(12), Dec. 1994.*

Alexander Stepanov, "The Standard Template Libraries", BYTE, v 20, n10, p177(2), Oct. 1995.*

Michael Vilot, "Examining the Systems<Toolkit> library", Dr. Dobb's Journal, v21 n11 p80(5), Nov. 1996.*

Michael Vilot, "The C++ standard library: an extensible collection of software components", Aug. 1995.*

Stepavov et al, "The Standard Template Library", Oct. 1995.*

* cited by examiner

FRAMEWORK I FOUNDATION CLASS: FW_I_ARRAY

INNER CIRCLE = ATTRIBUTES
OUTER CIRCLE = METHODS

*FIG. 8*

OBJECT FW_I_ARRAY

FUNCTIONAL DESCRIPTION:

GET_ARRAY_SIZE: RETURNS THE NUMBER OF ELEMENTS WHICH MAY BE STORED IN THE ARRAY.

SET_ARRAY_SIZE: ESTABLISHES THE SIZE OF AN EMPTY OR EXISTING ARRAY.

GET_ELEMENT: RETURNS THE ELEMENT STORED AT THE CURRENT INDEX.

SET_ELEMENT: SETS THE VALUE FOR THE ELEMENT AT THE CURRENT INDEX.

ADD_ELEMENT: ADDS AN ELEMENT ONTO THE END OF THE ARRAY BY GROWING IT BY ONE ELEMENT.

DELETE_ELEMENT: REMOVES THE ELEMENT AT THE CURRENT INDEX.

GET_INDEX: RETRIEVE THE CURRENT INDEX VALUE.

SET_INDEX: SET THE CURRENT INDEX VALUE.

*FIG. 9*

DATA_TYPES.H

// (1) Map MFC data types to standard C++ data types //

```
typedef unsigned char      BYTE;    // 8-bit unsigned entity
typedef unsigned short     WORD;    // 16-bit unsigned number
typedef unsigned int       UINT;    // unsigned number
typedef long               LONG;    // 32-bit signed number
typedef unsigned long      DWORD;   // 32-bit unsigned number
typedef int                BOOL;    // Boolean (0 or !=0)
```

// (2) MFC CString class mappings //

```
#ifdef INTERNATIONALIZED
typedef wchar_t            WCHAR;
typedef WCHAR              TCHAR;
#else
typedef char               WCHAR;
typedef WCHAR              TCHAR;
endif typedef char *                    LPSTR;   // ptr to string
typedef unsigned const char *     LPCSTR;  // ptr to read-only string
typedef const WCHAR *             LPCWSTR;
typedef const TCHAR *             LPCTSTR;
```

// (3) Map for MFC type Position - i.e., position within a linked list //

```
typedef void *             POSITION;
```

*FIG. 10*

EXAMPLE PORTING LAYER IMPEMENTATION OF FW_I_ARRAY METHOD:
*SET_ARRAY_SIZE*

```cpp
template<class TYPE, class ARG_TYPE>
void FW_I_ARRAY::SET_ARRAY_SIZE(int nNewSize,
                                 int nGrowBy)
{
   /* C++ STL routine for allocating memory */
   rw_array.reserve(nNewSize);

/* C++ STL routine for determining if additional
      memory is required. */
   rw_array.resize(nNewSize);

/* Save State Information */
   itsCurSize = nNewSize;

/*Use DEFAULT_GROWTH if nGrowBy is < 0,
     else use constant growth. */
   if ( 0 > nGrowBy) {
      itsGrowBy = c_DefaultGrowth;
   } else {
      itsGrowBy = nGrowBy;
   }

/* C++ routine for initializing array. */
   init_array(rw_array, 0, rw_array.size());
}
```

*FIG. 11*

METHOD FOR EMULATING NATIVE OBJECT ORIENTED FOUNDATION CLASSES ON A TARGET OBJECT ORIENTED PROGRAMMING SYSTEM USING A TEMPLATE LIBRARY

FIELD OF THE INVENTION

The present invention relates generally to software reusability, and more particularly, to a system and method for porting code written to operate on a native object oriented computer programming system to alternative target object oriented computer programming systems by emulating the native object oriented foundation classes using a porting layer and a template library.

BACKGROUND OF THE INVENTION

Object Oriented Programming Systems (OOPS) have been developed and are in use in the computer industry to provide a sophisticated and efficient method for modeling real-world objects and for providing the ability to expand and reuse other objects. Objects are complex data structures which model real-world entities, and are associated in classes and identified with their informational features ("attributes") and functional features ("behaviors" or "methods"). Objects are effected using object oriented programming languages such as C++. By defining complex, specialized data structures or objects that model real-world entities, software application development is made easier and more natural as the level of abstraction of data is raised to a point where applications can be implemented effectively in the same terms in which they are described by the users of the application. Objects are more readily classifiable into types, which are easily related to one another in subtype/supertype hierarchies. Object oriented programming languages permit the programmer to flexibly define data types so as not to be constrained by limited predefined types. Object oriented programming language types can be associated in classes which can "inherit" attributes and/or methods from other classes.

In a sophisticated OOPS, an application framework is developed for use by application programmers as the basis upon which software applications are built. The application framework is a set of classes which provide services necessary to run on a specific operating system. An example of an application framework is the Microsoft® Foundation Classes developed for the Microsoft® Windows operating system. The application framework assists the application programmer by removing the application requirements from the operating system requirements by providing an object oriented Application Programming Interface (API). An API can be implemented as an object with attributes and methods which performs services at lower levels in the programming layer hierarchy. An API's defined attributes are derived from defined data types specific to the operating system. An API's methods allow an application to access the API's attributes and also provide services while separating the application from the details unique to the specific operating system. Generally speaking, a particular OOPS manufacturer will provide an application framework and a set of defined APIs to a user or application programmer but will not release the source code which implements the framework and API calls. This practice results in the requirement that all applications written using the application framework and defined APIs of the manufacturer's computer system be run only on the manufacturer's or a compatible computer system. As a result, applications cannot be easily ported from one object oriented computer programming system based on one operating system to another object oriented computer programming system based on another operating system. It would be desirable to provide the ability for software applications written for one such object oriented computer programming system to be able to be run on alternative object oriented computer programming systems.

In the prior art, applications designed to run on computers based on one operating system and hardware configuration could be ported to run on another computer running a different operating system and having a different hardware configuration only with expense and difficulty. One method for porting a software application from one system to another involves purchasing an application framework source code license from the OOPS manufacturer to use and alter the source code of the framework to interface properly with the target operating system. This method, however, incurs expense in obtaining the source code license and also requires considerable engineering time for modifying the framework source code to allow for historical differences of data types and complying with the target operating system interface.

Another method for porting a software application from one system to another involves purchasing a source code license from the software application manufacturer to use and alter the source code of the application to interface properly with the target framework. This method, however, also incurs expense in obtaining the application source code license and requires valuable engineering time to modify the application source code to interface correctly with the application framework of the new environment. In addition, this process must be repeated for each new version of the application software that is released and for every application that is to be ported to the other system.

It would be therefore be desirable to provide a system and method for porting applications from one object oriented programming system to another object oriented programming system that requires minimal overhead in cost and engineering time. It would also be desirable to provide a system and method for porting any number of applications from one object oriented programming system to another object oriented programming system for the cost of porting a single application from one system to the other.

SUMMARY OF THE INVENTION

Accordingly, the present invention provides an improved method of porting object oriented software applications from one object orient computer programming system to another. The present invention also provides a system and method for porting applications from one object oriented programming system to another object oriented programming system that requires minimal overhead in cost and engineering time. The present invention further provides a system and method for allowing any number of object oriented applications written for the same object oriented programming system (OOPS) to be ported to a different OOPS for the price of porting a single object oriented application from one system to the other.

These and other objects are accomplished in accordance with the present invention by providing a system and method for porting a software application from a native OOPS to a target OOPS, where the native OOPS includes an application framework layer built on a set of defined native foundation classes and an operating system layer running a native operating system and the target OOPS includes an operating system layer running a target operating system different than the native operating system. The software application ported by the present invention is implemented to interface with the native object oriented programming system via application programming interface (API) objects which are instances of the defined native foundation classes. The method of the present invention includes steps for defining a set of target object oriented programming system data types in terms of native object oriented programming system data types, and emulating the native foundation classes using calls to a template library such that the API method calls interface with the target operating system in a functionally equivalent manner as if the application were being run on the native OOPS. The native foundation classes may be emulated by implementing a porting layer in an object oriented programming language. The porting layer may include the set of target object oriented programming system data types, the template library, and a functional procedure implemented for each API method invoked by the native application. Each functional procedure maps a functionality of an API method to calls to routines in the template library. The software application is then recompiled with the porting layer to generate a target executable software application which may be run on the target object oriented programming system. In the preferred embodiment, the porting layer is implemented in the C++ programming language and the template library is the ANSI/ISO C++ Standard Template Libraries.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

The present invention will now be described more fully hereinafter with reference to the accompanying figures, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art.

Figure 1:
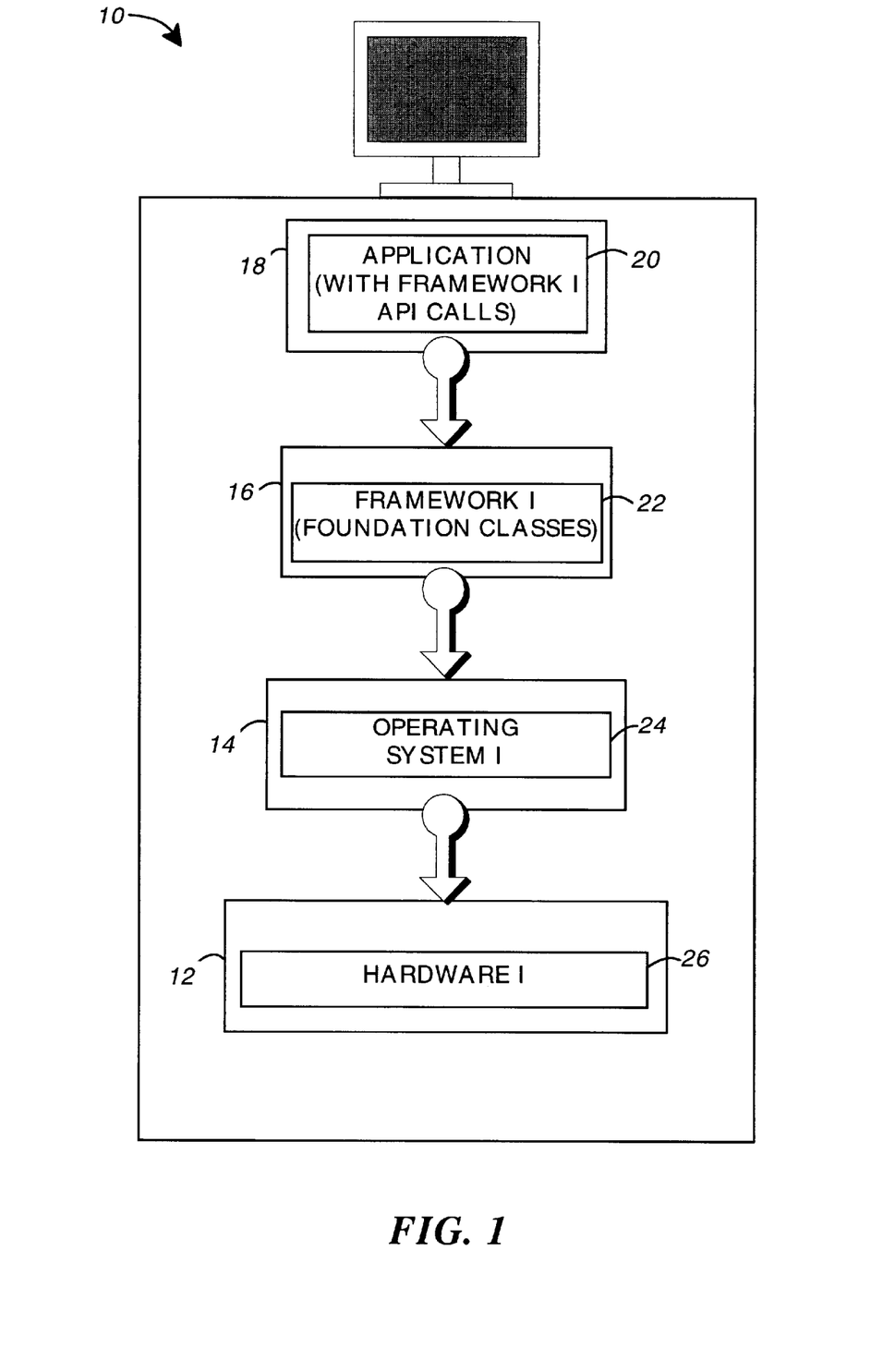
FIG. 1 is a block diagram of the structure of a native object oriented programming system.

FIG. 1 depicts the operating structure of an Object Oriented Programming System (OOPS). The OOPS 10 may run a user application 20 which is facilitated by a plurality of programming layers 12–18. The user application 20 is an object oriented program written to direct and control activities of the OOPS 10 from an application programming layer 18 using application programming interface (API) calls. The APIs are functional objects defined for the OOPS 10 at an application framework programming layer 16. In the application framework programming layer 16, a framework FRAMEWORK I 22, also known as the foundation classes of the OOPS 10, is defined and implemented, including the definitions and implementations of the APIs. The implementation details of the framework FRAMEWORK I are generally not visible to the application 20 or application programmer from the application programming layer 18. The application framework programming layer 16 defines FRAMEWORK I foundation class attributes in terms of or derived from data types defined at an operating system programming layer 14. The application framework programming layer 16 also defines the FRAMEWORK I foundation class methods and implements the methods via attribute accesses and method calls to objects defined at the operating system programming layer 14 level by an operating system OPERATING SYSTEM I 24. The implementation details of the OPERATING SYSTEM I 24 are generally not visible from the FRAMEWORK I 22 or from the application framework programming layer 16. An example of a FRAMEWORK I 22 and OPERATING SYSTEM I 24 which are widely used in the industry is the Microsoft® Foundation Classes (MFCs) developed for use with the Microsoft® Windows-type operating systems (including Microsoft® Windows, Microsoft® Windows NT, Microsoft® Windows95 and Microsoft® Windows97). The OPERATING SYSTEM I 24 comprises operating system objects which access and direct activity of the hardware programming layer 12. OPERATING SYSTEM I 24 is thus hardware specific. The hardware programming layer 12 processes instructions as directed by the OPERATING SYSTEM I 24, responds to interrupts, and manages data and instruction input and output (I/O) specific to the hardware configuration HARDWARE I 26 of the OOPS 10. The activity on the hardware programming layer 12 is ideally not visible from the operating system programming layer 14. The hierarchical nature of the OOPS 10 removes details of the specific operating system OPERATING SYSTEM I 24 and hardware configuration HARDWARE I 26 from the user or application programmer.

Figure 2:
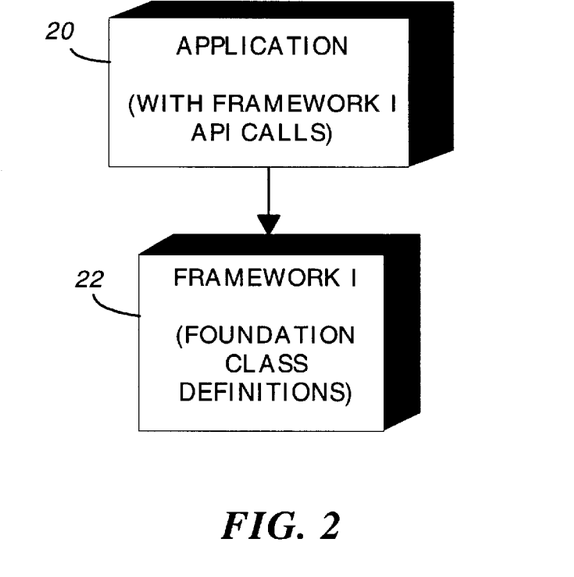
FIG. 2 is a block diagram of the portion of the native object oriented programming system of FIG. 1 which is of interest to an application programmer.

FIG. 2 is a block diagram of the portion of the OOPS 10 of FIG. 1 which is of interest to an application programmer. As shown in FIG. 2, the application 20 is implemented to operate on the OOPS 10 in a desired manner by making API method calls to objects defined by the foundation classes FRAMEWORK I 22 at the application framework programming level 16. Ideally, the full operational functionality of the OOPS 10 is facilitated by the defined foundation classes of FRAMEWORK I 22 and the implementation details of FRAMEWORK I 22 are hidden from the application 20. Thus, the application 20 or its programmer need only know the foundation class definitions and functionality of FRAMEWORK I 22 in order to make appropriate API method calls to operate the OOPS 10 in a desired manner. Indeed, the actual implementation details of the defined foundation classes of FRAMEWORK I 22 are often proprietary and therefore not available to the application programmer.

Figure 3:
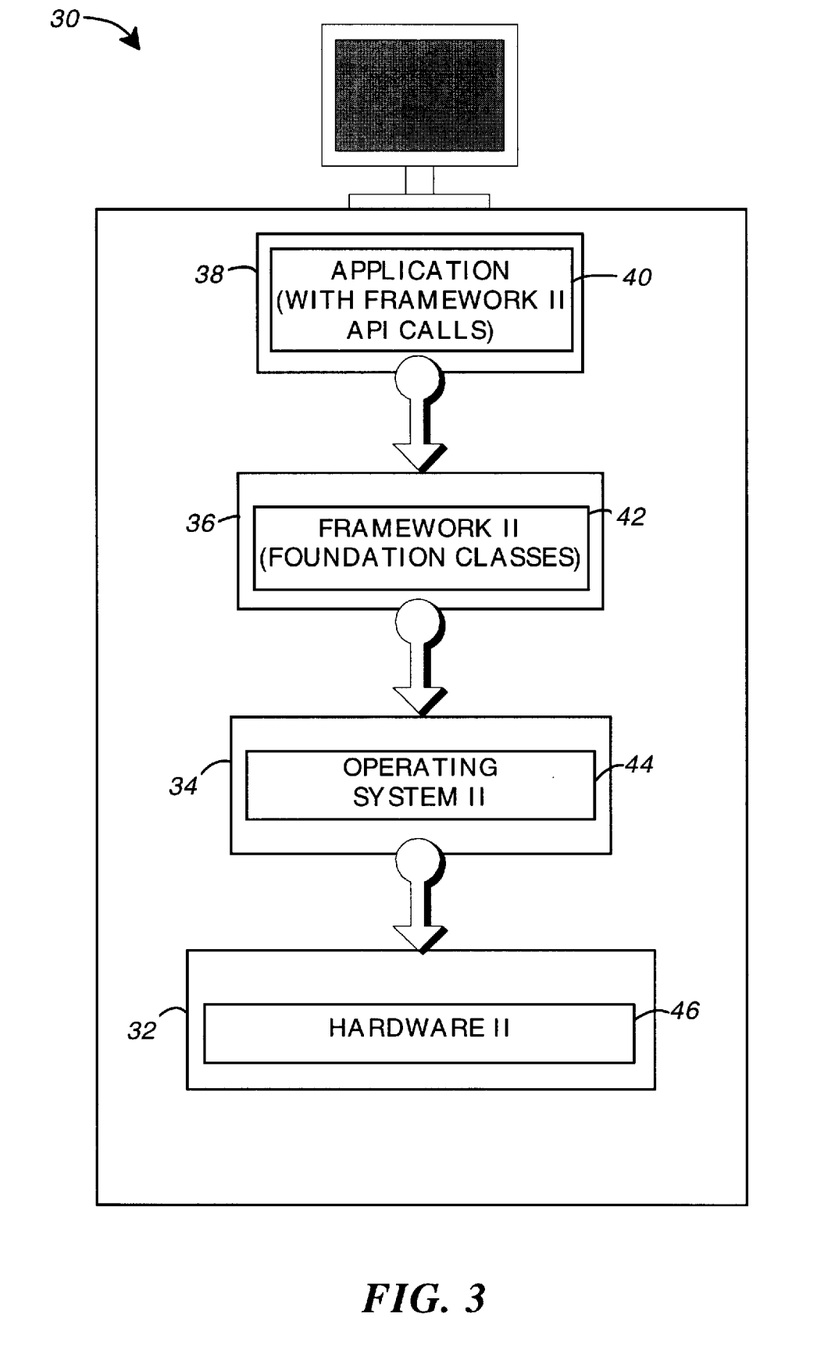
FIG. 3 is a block diagram of the structure of a target object oriented programming system.

As will be appreciated from the previous discussion, however, without modification of the source code, the application 20 may only run on an OOPS of the type having the same foundation class definitions as FRAMEWORK I 22 at its application framework programming layer 16 of the OOPS 10. FIG. 3 depicts an OOPS 30 based on a different hardware configuration HARDWARE II 46. The hardware configuration HARDWARE II 46 of the OOPS 30 resides at a base hardware programming layer 32 and is accessed and directed by an operating system OPERATING SYSTEM II 44 at an operating system programming layer 34. The operating system OPERATING SYSTEM II 44 is in turn accessed and directed by a set of objects defined by foundation classes FRAMEWORK II 42 at an application framework programming layer 36. Objects on the application framework programming layer 42 are accessed and directed by an application 40 at an application programming layer 38. It is to be assumed for the purposes of describing the present invention that the set of foundation classes, FRAMEWORK II 42, in the application framework programming layer 36 of FIG. 3 are different than the set of foundation classes, FRAMEWORK I 22, of the OOPS 10 of FIG. 1. One reason that FRAMEWORK I 22 might be different than FRAMEWORK II 42 is that the operating system OPERATING SYSTEM II 44 in the operating system programming layer 34 and the hardware configuration HARDWARE II 46 of the hardware programming layer 32 of the OOPS 30 are different than the respective operating system OPERATING SYSTEM I 24 in the operating system programming layer 14 and the hardware configuration HARDWARE I 26 of the hardware programming layer 12 of the OOPS 10. As a result, applications 40 at the application programming layer 38 of OOPS 30 may be run only if they make API method calls to objects which are defined in the foundation classes of FRAMEWORK II 42 on the application framework programming layer 36. It will be appreciated by one skilled in the art that if the framework FRMEWORK II 42 defined on the application framework programming layer 36 of OOPS 30 [hereinafter "target OOPS 30"] is different than the framework FRAMEWORK I 22 defined on the application framework programming layer 16 of OOPS 10 [hereinafter "native OOPS 10"], then applications which run at the application programming layer 18 on native OOPS 10 do not run properly on the target OOPS 30 of FIG. 3. More specifically, native application 20 of FIGS. 1 and 2 will not run on the target OOPS 30 in FIG. 3.

Figure 4:
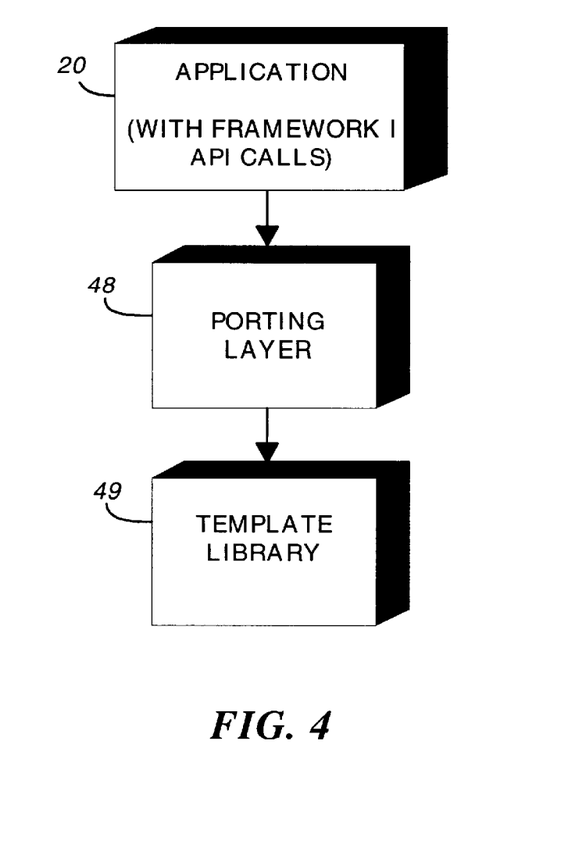
FIG. 4 is a block diagram of the portion of the target object oriented programming system of FIG. 3 which embodies the heart of the present invention.

FIG. 4 shows a portion of the target OOPS 30 which embodies the heart of the present invention. As shown in FIG. 4, the source code of the target application 20 of FIG. 2 which is designed to run on the native OOPS 10 of FIG. 1 remains unchanged. It still makes native FRAMEWORK I 22 API method calls. However, the applications framework programming layer 36 of the target OOPS 30 in the present invention is designed to include a porting layer 48 which makes calls to a template library 49. The porting layer 48, as discussed in more detail hereinafter, defines native FRAMEWORK I 22 data types in terms of target OPERATING SYSTEM II 44 data types and maps native FRAMEWORK I API method calls to calls to the template library 49.

The template library 49 is a general-purpose library comprising generic algorithms and container classes. Importantly, the template library 49 allows a variety of container lasses to be passed to each generic algorithm. The name "template" is derived from the template mechanism provided by the generic algorithms and container classes taken together. This template mechanism allows programmers to simply select a generic algorithm and a container class or class derived from a container class, and then let the compiler perform the type-checking and generate the type-specific cod for the chosen algorithm. The beauty of the template library is that it eliminates the prior art need for the programmer to write the same algorithm for each data type used (when overloading procedures). An example of such a template library is the ANSI/ISO C++ Standard Template Library. For a detailed discussion of template libraries and the C++ Standard Template Library, see Musser, David R. and Saini, Atul, "C++ Programming with the Standard Template Library", Addison-Wesley, Reading, Massachusetts, Oct. 1996, ISBN 0-201-63398-1, incorporated herein by reference. Although at the time of filing of this application, U.S. Serial No. UNKNOWN, the only commercially available template library is the Standard Template Library (STL) which is part of the larger software library, the C++ (Draft) Standard Library approved by the ANSI/ISO C++ committee in its X3J16 report, and which is incorporated herein by reference, it is to be understood that any future template library which provides generic algorithms and container classes may also be used to implement the present invention.

In the preferred embodiment of the present invention, the native OOPS 10 is a Pentium-based machine having an Intel® Pentium or compatible processor as part of its native hardware configuration HARDWARE I 26. Native FRAMEWORK I 22 in the preferred embodiment defines Microsoft® Foundation Classes (MFCs) and implements the MFCs to successfully interface with the native OPERATING SYSTEM I 24 overlying the Pentium processor (HARDWARE I 26). A detailed discussion of Microsoft® Foundation Classes may be found in Sheperd, George, and Wingo, Scot, "MFC Internals: Inside the Microsoft® Foundation Class Architecture", Addison-Wesley Publishing Company (1996), ISBN 0-201-40721-3, and is incorporated herein by reference. In the preferred embodiment, the native OPERATING SYSTEM I 24 is a Microsoft® Windows-type operating system (i.e., Microsoft® Windows, Microsoft® Windows NT, Microsoft® Windows95, Microsoft® Windows97). Also in the preferred embodiment of the present invention, the target OOPS 30 is a Hewlett-Packard® HPUX machine (HARDWARE II 46) running HP-UNIX as the target OPERATING SYSTEM II 44 at its operating system programming layer 34. The template library 49 in the target applications framework programming layer 36 is implemented using the Standard Template Library (STL) incorporated into the Standard C++ Library with Tools.h++, which conforms to the ANSI/ISO standard and is manufactured by Rogue Wave Software. The source code of the application 20 is recompiled with the porting layer 48 and template library 49 in the preferred embodiment using the Hewlett-Packards ANSI/ISO C++ compiler.

Figure 5:
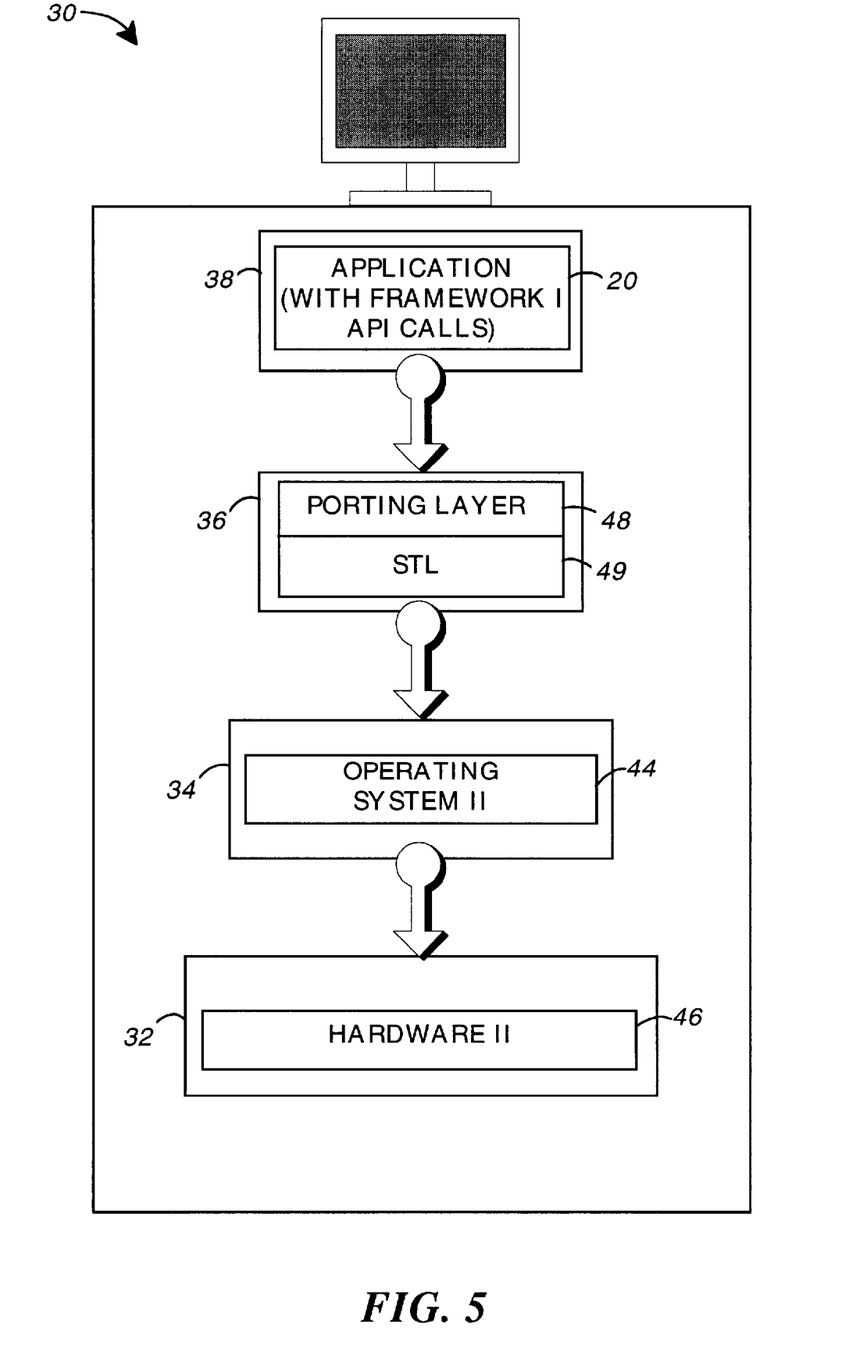
FIG. 5 is a block diagram of the structure of the target object oriented programming system of FIG. 3 which incorporates the present invention.

FIG. 5 shows the structure of the target OOPS 30 of FIG. 3 which incorporates the present invention to enable it to run the native application 20 which was written to run on the native OOPS 10. The operation of the target OOPS 30 of FIG. 5 will be described in detail in terms of the preferred embodiment. In the preferred embodiment, the present invention runs an MFC-based application 20 at the applications programming layer 38 of the target OOPS 30. When MFC method calls (i.e., FRAMEWORK I API method calls)

are executed, the application framework programming layer 36 of target OOPS 30 includes a porting layer 48 which emulates the MFC method utilizing the C++ Standard Template Library (STL) 49. The C++ STL routines, when compiled using the HP-UX target system's HPUX ANSI/ISO C++ compiler, interface properly with HP-UX® (i.e., target OPERATING SYSTEM II 44) at the target operating system programming layer 34. Target OPERATING SYSTEM II 44, or HP-UX® in the preferred embodiment, then directs the operation of the target hardware programming layer 32. It will be appreciated by one skilled in the art that once the porting layer 48 is designed and compiled, the application programming layer 38 may run any MFC-based program as long as all of the MFC methods invoked by the MFC-based program are emulated in the porting layer 48.

Figure 6:
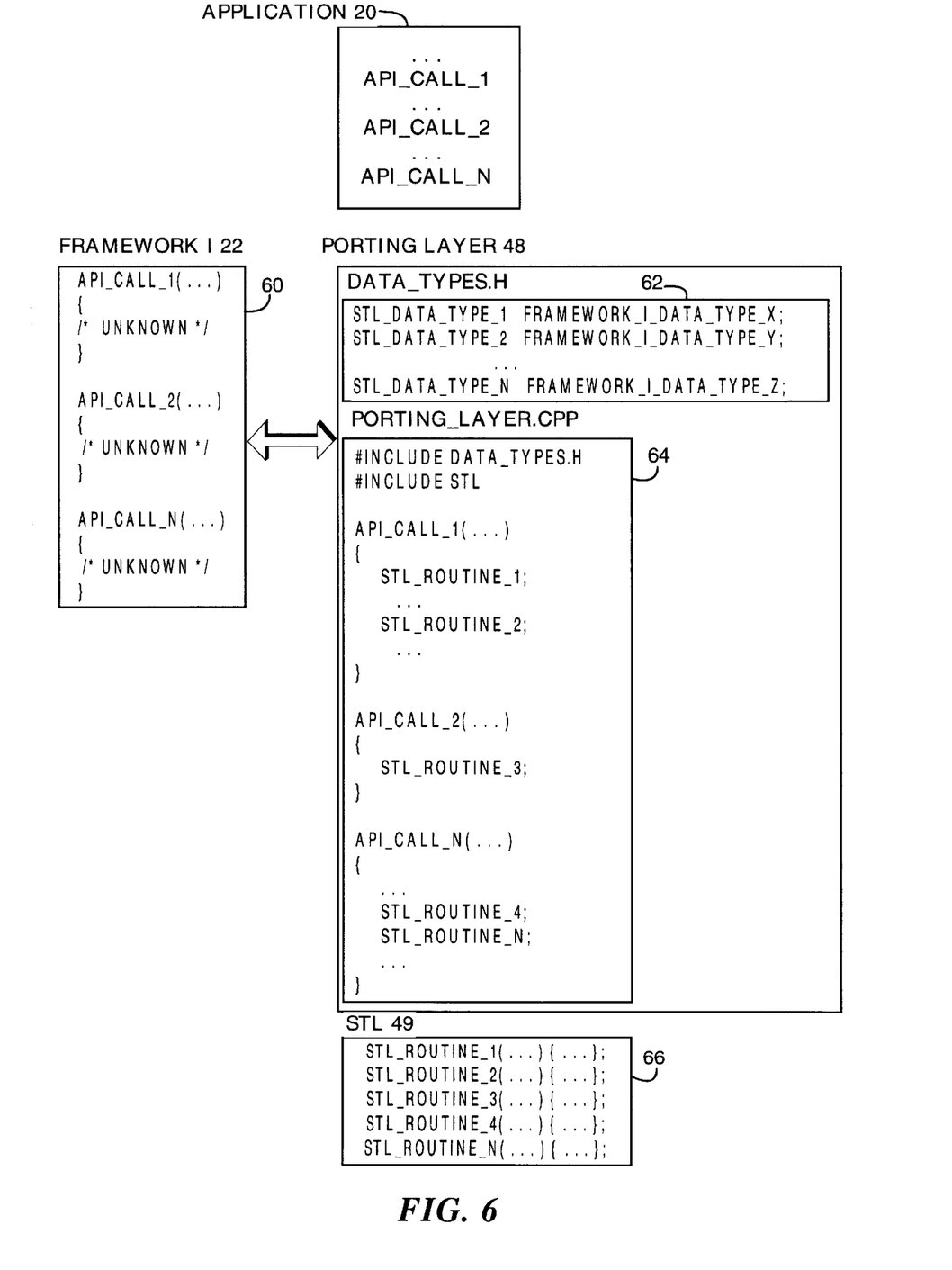
FIG. 6 is a diagram illustrating an implementation of a preferred embodiment of the present invention.

FIG. 6 is a diagram showing hypothetical source code of a native application 20 with FRAMEWORK I API method calls. FIG. 6 also shows a comparison of a corresponding FRAMEWORK I implementation file 60 for a native OOPS 10 versus the corresponding porting layer 62, 64 and STL 66 files. As shown in FIG. 6, the application 20 makes hypothetical API method calls, API_CALL_1 through API_CALL_N. As also shown in FIG. 6, the implementation details of the API method calls in the implementation file 60 of FRAMEWORK I 22 are unknown to a programmer not affiliated with the native OOPS manufacturer (either through employment or licensing agreements). In order to emulate the functionality of the native FRAMEWORK I APIs, the target application framework programming layer 36 includes a porting layer 48 and a template library 49. As shown in FIG. 6, the porting layer 48 may emulate the native FRAMEWORK I API functionality by including a header file DATA_TYPES.H 62 and a porting layer implementation file PORTING_LAYER.CPP 64. As shown in the header file DATA_TYPES.H 62, native OOPS 10 data types are mapped to equivalent target OOPS 30 data types so that the data types used by the native application 20 will translate properly to data types recognized by the target OOPS 30. The porting layer implementation file PORTING_LAYER.CPP 64 contains a functional procedure for each of the native FRAMEWORK I API methods invoked by the native application 20. As shown in the porting layer implementation file PORTING_LAYER.CPP 64, the implementation details of each of the corresponding functional procedures provide their functionality by making calls to STL routines whose templates are implemented in the STL file 66. The header file DATA_TYPES.H 62, porting layer implementation file PORTING_LAYER.CPP 64, and the STL file 66 are compiled with the source code of the native application 20. The type-specific STL code is generated at compile time. The compiler produces a target executable file which is a target executable version of the native application 20 and which may be run on the target OOPS 30.

Figure 7:
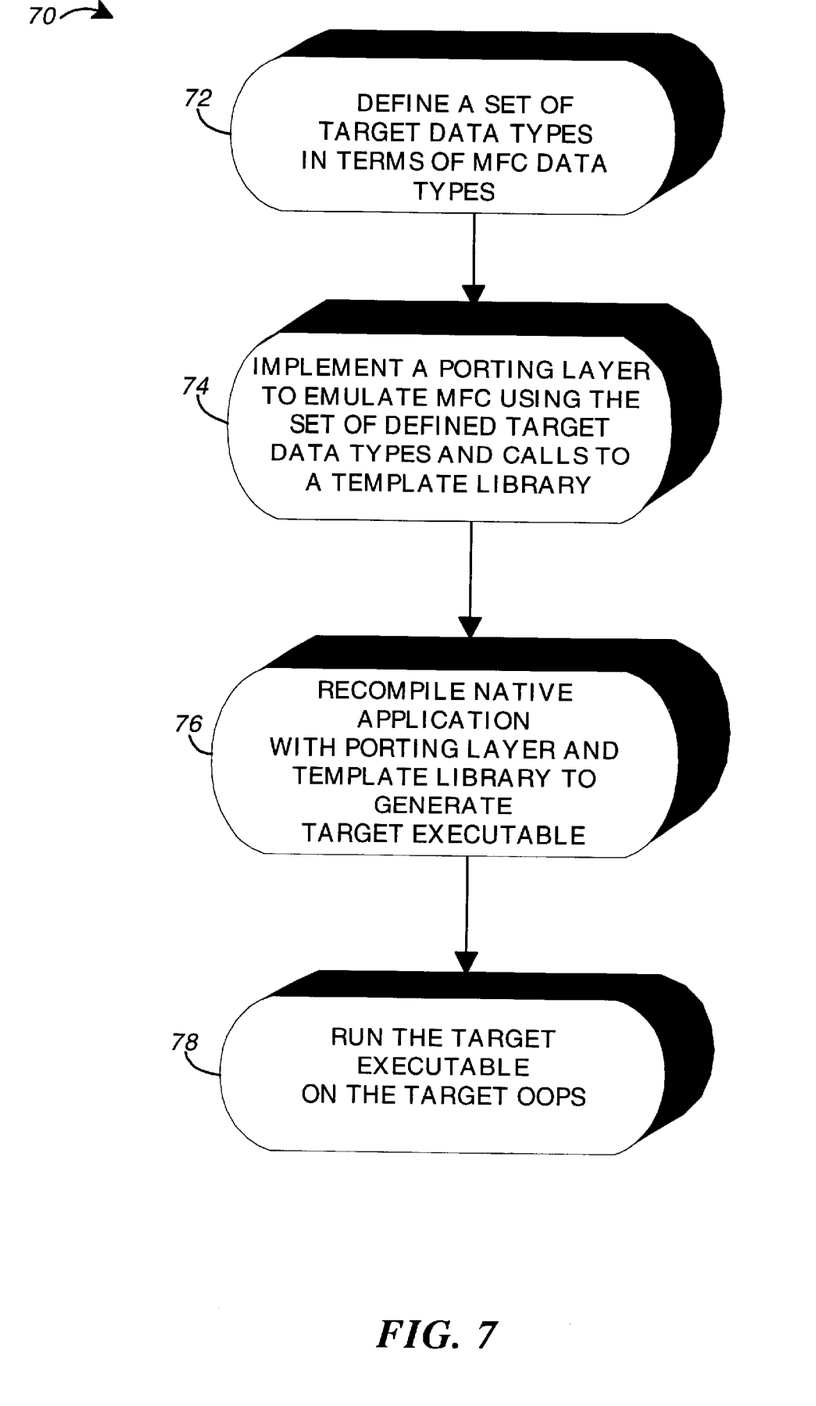
FIG. 7 is a flowchart illustrating the method of the present invention.

FIG. 7 is a flowchart illustrating the method of the present invention. As shown in FIG. 7, the method of the present invention, shown generally at 70, includes a first step 72 of defining a set of target OOPS 30 data types in terms of the native OOPS 10 data types. This step ensures that the data types used by objects in the native application program 70 of OOPS 10 will be compatible with the data types used by objects in the application framework programming layer 36, operating system programming layer 34 and hardware programming layer 32 of the target OOPS 30. In the preferred embodiment, the data types defined by and used in the Microsoft® Foundation Classes (MFCs) are mapped to a new set of data types used by the C++ Standard Template Library. The new definitions are created and located in a C++ header file such as DATA_TYPES.H 62 of FIG. 6.

The method 70 of the present invention includes a second step 74 of implementing a porting layer 48 which emulates each of the native API methods invoked by the native application 20. In the preferred embodiment, the native API methods are defined by MFCs. The porting layer 48 is implemented by mapping MFC method calls and attribute accesses to object method calls and attribute accesses of objects defined and implemented using the C++ Standard Template Library. The implementation details of the porting layer in the preferred embodiment reside in a porting layer implementation file such as PORTING_LAYER.CPP 64 in FIG. 6. As known by those skilled in the art, the C++ STL generally comprises a set of service routines whose source code conforms to the industry-wide ANSI/ISO standard such that C++ source code compilers for various computer systems throughout the industry will generate executable code to operate on their respective computer systems in a similar manner for each STL routine. It will also be appreciated by one skilled in the art that the implementation of the porting layer 48 using calls to the C++ STL 49 allows the source code of the native application 20 to remain unchanged and the emulated MFC APIs to retain their object oriented nature at the application framework programming layer 36 of the target OOPS 30. In the preferred embodiment the porting layer 48 is implemented in one or more files, which include the type definition header file created in step 72 and porting layer routines which emulate each of the MFC API method calls using the C++ Standard Template Library 49.

Once the porting layer 48 is implemented, the method 70 includes a third step 76 of recompiling the native application 20 with the porting layer 48 and its included header file from step 72 and the C++ Standard Template Library 49 to generate executable code which may be run on the target OOPS 30. This step 76 generally involves creating a makefile which adds the porting layer 48, header file and STL 49 to the include path. When the makefile is run, a binary executable target application is created. In step 78, the executable target application may then be run on the target OOPS 30.

It is of significance that the source code of the native application 20 is not modified. One skilled in the art will also appreciate that once the header file which defines the MFC data types in terms of the target Object Oriented data types has been created in step 72 and the porting layer has been implemented in step 74, these two steps need not be repeated when porting other native applications to the target OOPS 30. This is true as long as each native application being ported to the target OOPS 30 only invokes native API methods which have already been implemented in the porting layer 48. In other words, the porting layer may be reused for as many native applications 20 as desired as long as the porting layer 48 has implemented the required native APIs for each native application 20 being ported. It is clear that the present invention provides an efficient and inexpensive method for porting native Object Oriented applications to a target OOPS by requiring a one-time overhead expense of developing the porting layer 48. Once the porting layer 48 has been developed, no extra cost is incurred in porting additional native applications or in re-engineering due to application or target operating system version updates.

Figure 8:
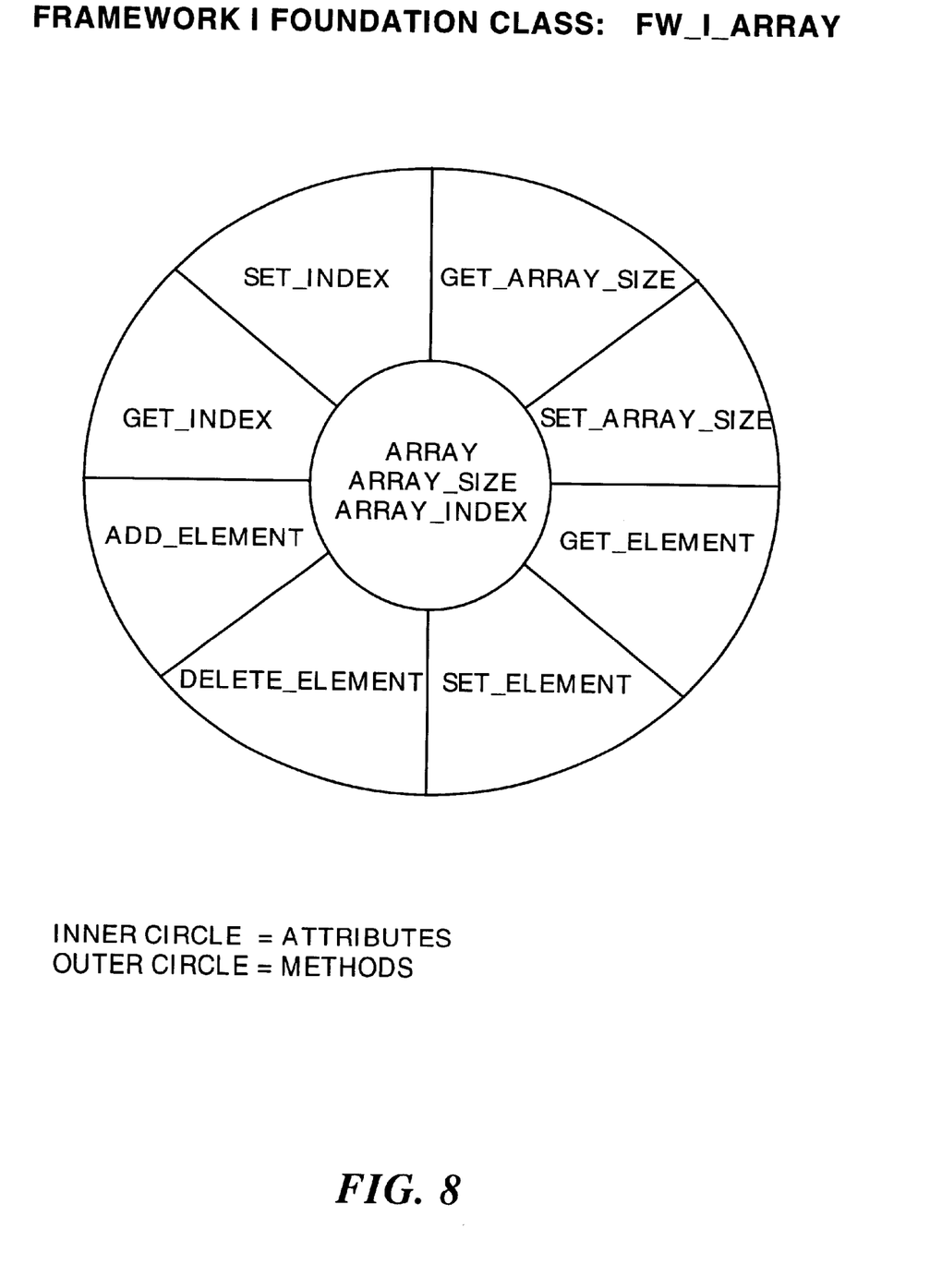
FIG. 8 is an example native foundation class used to illustrate an example implementation of the present invention.

FIG. 8 illustrates an example FRAMEWORK I foundation class API object called FW_I_Array. Generally only the class definition of FW_I_Array, as shown in FIG. 8, is visible to the application programmer. The implementation details of the FW_I_Array object are implemented in the framework programming layer 16 of the native OOPS 10 which may be inaccessible to the programmer for proprietary reasons. As shown in FIG. 8, the FW_I_Array API object includes a set of attributes (ARRAY, ARRAY_SIZE, ARRAY_INDEX) surrounded by a set of methods (SET_ARRAY-SIZE, GET_ARRAY_SIZE, ADD_ELEMENT, DELETE_ELEMENT, GET_ELEMENT, SET_ELEMENT, GET_INDEX, SET_INDEX) which provide operations to access the attributes. Thus the data structure of the FW_I_Array object is encapsulated within the FW_I_Array methods. The implementation details of the FW_I_Array methods are unknown. However, their functional descriptions are known.

Figure 9:
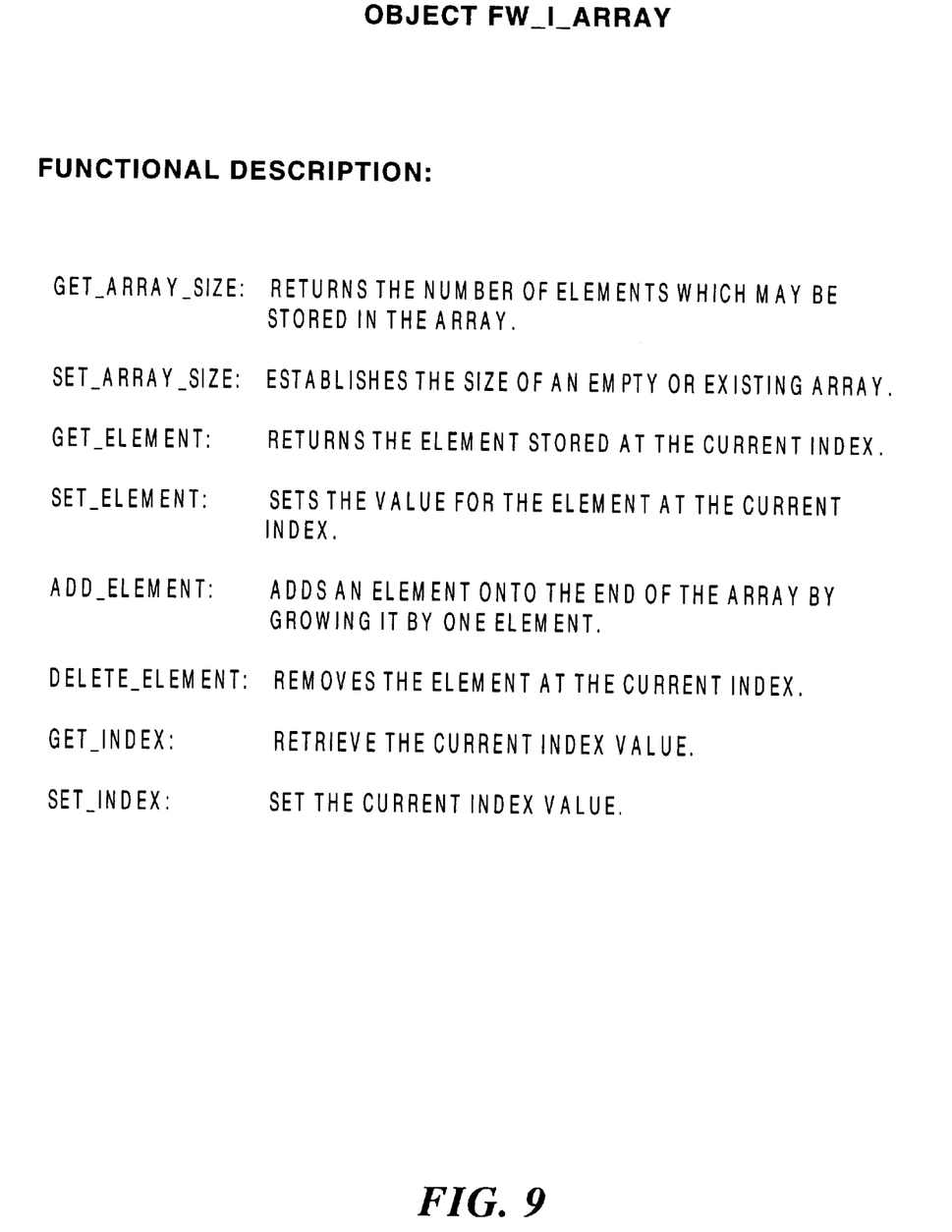
FIG. 9 is an example functionality description of the native foundation class of FIG. 8.

FIG. 9 is a functional description of the methods of the FW_I_ARRAY API object of FIG. 8. As shown in FIG. 9, the FW_I_Array API object includes methods to establish or determine the size of an array, set or access the value of an element in the array, add or delete an element in the array, and set or retrieve the value of the array index.

Figure 10:
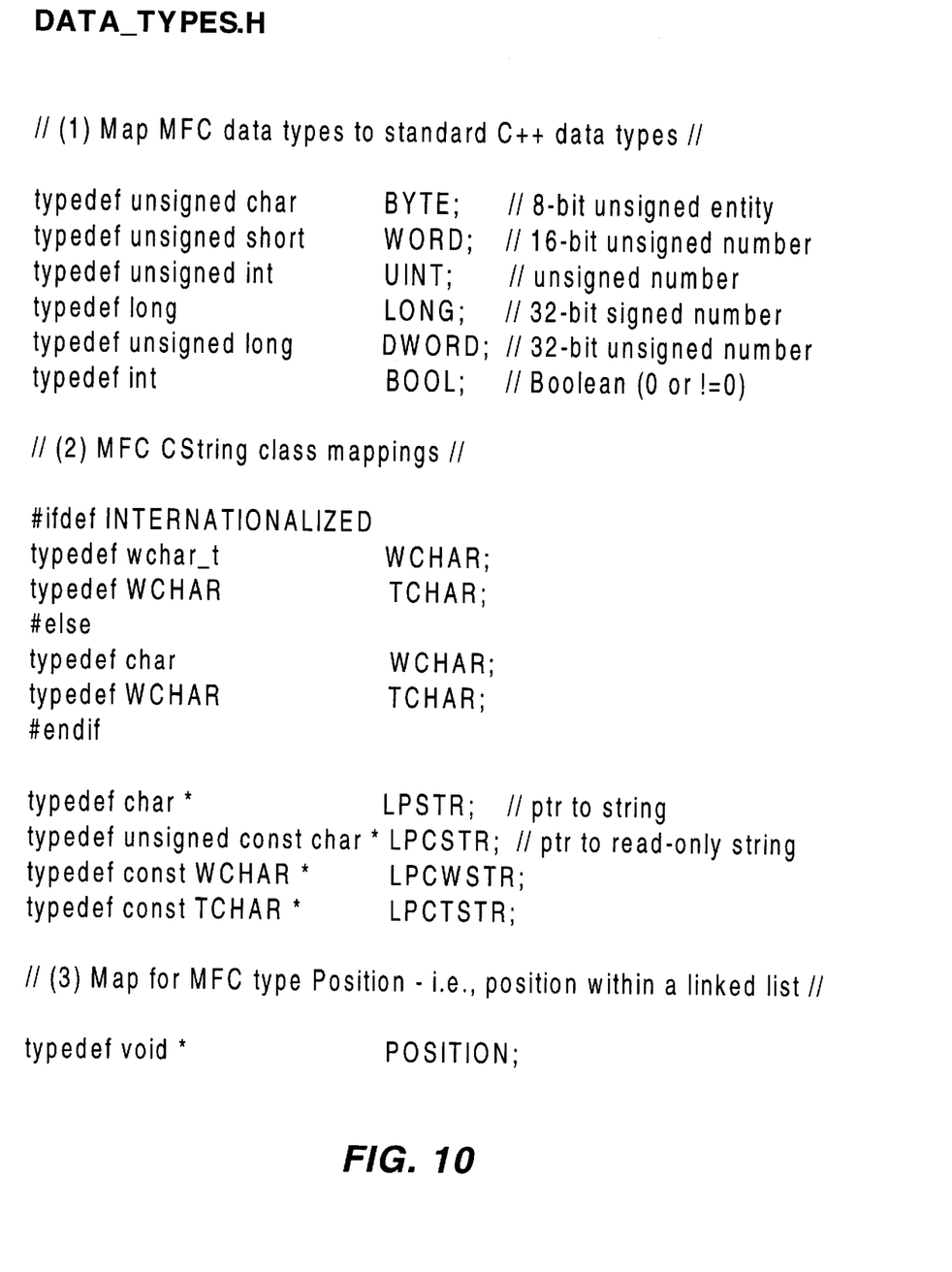
FIG. 10 is an example header file used in the implementation of the preferred embodiment of the present invention.

FIG. 10 is an example portion, shown here for illustration purposes, of a C++ header file DATA TYPES.H used in the preferred embodiment of the present invention. The header file of FIG. 10 includes a set of object oriented type definitions compatible with the C++ Standard Template Library defined in terms of the MFC data types. As shown in FIG. 10, the first set of type definitions, indicated by the corresponding number (1), define the MFC data types (BYTE, WORD, ..., BOOL) in terms of standard C++ data types (unsigned char, unsigned short, ..., int). The second get of type definitions, indicated by the corresponding number (2), are necessary to create the MFC CString class. The type definition indicated by the corresponding number (3) is an opaque abstract data type used by the various "list" MFCs to return the concept of a position within a linked list.

Figure 11:
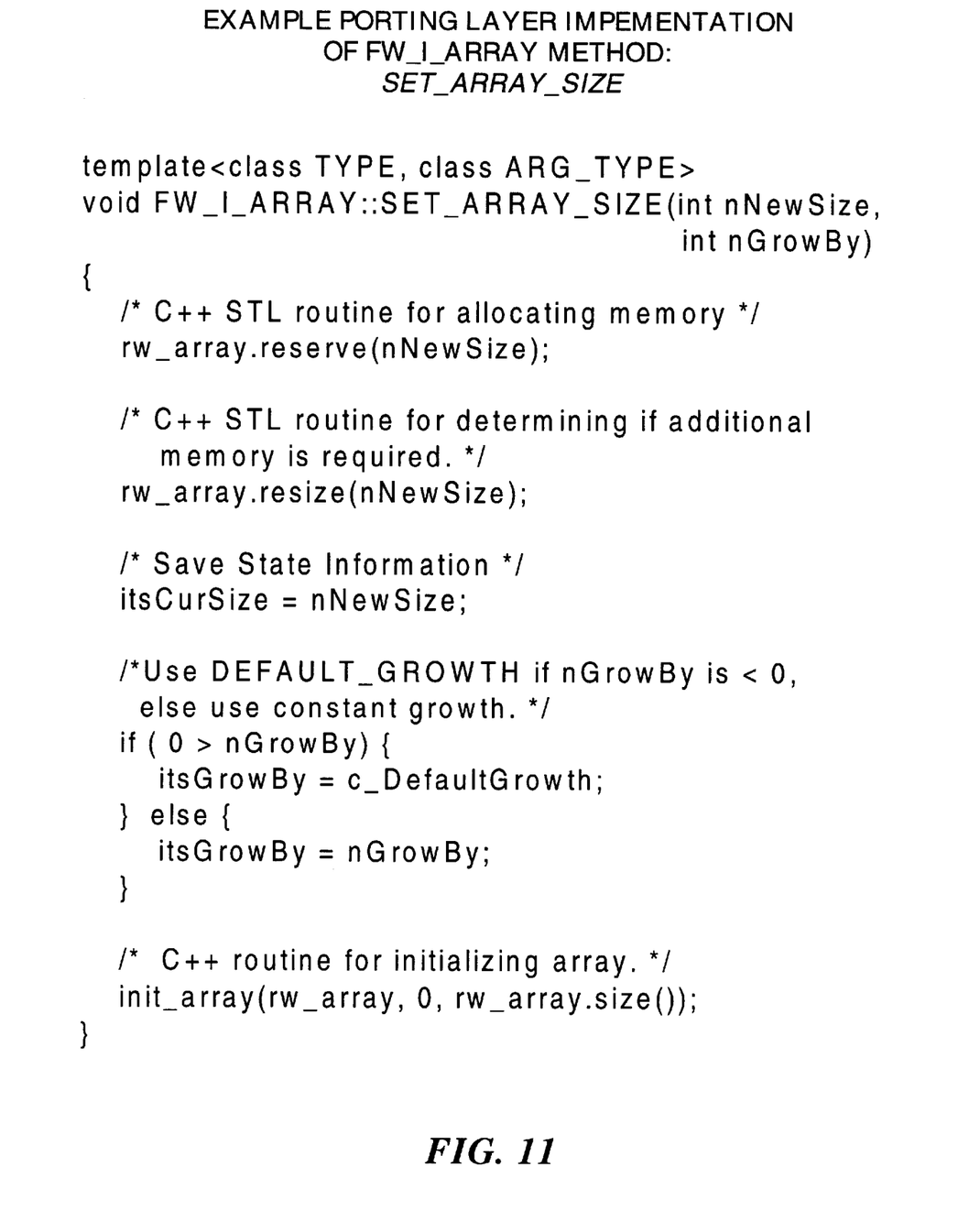
FIG. 11 is an example code illustration of a porting layer implementation of an example FRAMEWORK I API method.

FIG. 11 is example code, shown here for illustration purposes, of a porting layer implementation of the FRAMEWORK I object FW_I_Array method SET_ARRAY_SIZE. As shown in FIG. 11, the method implementation of SET_ARRAY_SIZE includes calls to the C++ Standard Template Library. For example, rw_array is an instance of the STL vector class. "Reserve" and "resize" are methods of the defined STL vector class.

It will be appreciated by one skilled in the art that the above described invention provides an improved method for porting object oriented software applications from one object orient computer programming system to another with minimal overhead in cost and engineering time. It will also be appreciated that the invention provides the capability of allowing multiple object oriented applications written for the same object oriented programming system to be ported to a different object oriented programming system for the price of porting a single object oriented application from one system to the other.

While illustrative and presently preferred embodiments of the invention have been described in detail herein, it is to be undegrtood that the inventive concepts may be otherwise variously embodied and employed and that the appended claims are intended to be construed to include such variations except insofar as limited by the prior art.

What is claimed is:

1. A computer-based method for porting a software application from a native object oriented programming system (OOPS) running a native object oriented operating system to a target object oriented programming system (OOPS) running a target object oriented operating system different than said native object oriented operating system, said native OOPS having an application framework layer built on a set of native foundation classes, and said software application implemented to interface with the native OOPS via an application programming interface (API), said API comprising methods built on said set of defined native foundation classes, the method comprising the steps of:

(a) defining a set of target OOPS data types in terms of said set of native OOPS data types; and (b) for each native foundation class method called by said software application, mapping the functionality of said native foundation class method to one or more methods in one or more standard libraries to execute on said target OOPS in a functionally equivalent manner as said native foundation class method running on the native OOPS, said mapping achieved without altering said software application.

2. The method of claim 1, comprising:

(c) recompiling the software application with said defined target OOPS data types, said mapped native foundation class methods, and said standard libraries to generate a target executable software application which runs on the target object-oriented programming system.

3. The method of claim 2, further comprising the step of:

(d) running the target executable software application on the target object oriented programming system.

4. The computer-based method of claim 2, wherein the standard libraries comprises a C++ Standard Template Library.

5. A computer-based system for porting a software application from a native object oriented programming system (OOPS) running a native object oriented operating system to a target object oriented programming system (OOPS) running a target object oriented operating system different than said native object oriented operating system, said native OOPS having an application framework layer built on a set of native foundation classes, and said software application implemented to interface with the native OOPS via an application programming interface (API), said API comprising methods built on said set of defined native foundation classes, the system comprising:

one or more standard libraries which may be compiled to run on the target OOPS; and a porting layer which defines a set of target OOPS data types in terms of native OOPS data types and for each native foundation class method called by said software application, defines a functional procedure mapping the functionality of said native foundation class method to one or more methods in one or more standard libraries to execute on said target OOPS in a functionally equivalent manner as said native foundation class method running on the native OOPS, said mapping achieved without altering said software application.

6. The system of claim 5, wherein the porting layer comprises:

a header file which defines the target OOPS data types in terms of the native OOPS data types; and one or more implementation files which together implement a functional procedure for each method invoked by the native application.

7. The system of claim 6, wherein the porting layer is implemented in a C++ programming language.

8. The system of claim 6, wherein the standard libraries comprise a C++ Standard Template Library.

* * * * *